United States Patent
Yang et al.

(10) Patent No.: US 11,831,464 B2
(45) Date of Patent: Nov. 28, 2023

(54) NETWORK ROUTING DEVICE AND METHOD

(71) Applicant: LG ENERGY SOLUTION, LTD., Seoul (KR)

(72) Inventors: Seong Yeol Yang, Daejeon (KR); Moon Koo Chung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/923,065

(22) PCT Filed: Jun. 24, 2021

(86) PCT No.: PCT/KR2021/007968
§ 371 (c)(1),
(2) Date: Nov. 3, 2022

(87) PCT Pub. No.: WO2022/005100
PCT Pub. Date: Jan. 6, 2022

(65) Prior Publication Data
US 2023/0155858 A1    May 18, 2023

(30) Foreign Application Priority Data

Jun. 29, 2020  (KR) .................. 10-2020-0079600

(51) Int. Cl.
*H04L 12/40* (2006.01)
*H04L 45/74* (2022.01)

(52) U.S. Cl.
CPC .. *H04L 12/40071* (2013.01); *H04L 12/40163* (2013.01); *H04L 45/74* (2013.01); *H04L 2012/40215* (2013.01)

(58) Field of Classification Search
CPC ......... H04L 12/40071; H04L 12/40163; H04L 45/74; H04L 2012/40215
See application file for complete search history.

(56) References Cited

U.S. PATENT DOCUMENTS 6,654,355 B1   11/2003   Marbach et al.
7,801,162 B2    9/2010   Jeon et al.
(Continued)

FOREIGN PATENT DOCUMENTS

JP          6486331 B2      3/2019
KR    10-2005-0091134 A    9/2005
(Continued)

OTHER PUBLICATIONS

International Search Report (with partial translation) and Written Opinion dated Sep. 27, 2021, for corresponding International Patent Application No. PCT/KR2021/007968.
(Continued)

*Primary Examiner* — Kibrom T Hailu
(74) *Attorney, Agent, or Firm* — Morgan, Lewis & Bockius LLP

(57) ABSTRACT

A network routing device for transmitting a frame between nodes connected to different communication networks among a plurality of communication networks is disclosed. The network routing device includes a routing processing circuit configured to determine a second network that is a routing target among the plurality of communication networks based on frame information received from a first network transmitting a frame among the plurality of communication networks. The network routing device also includes a frame conversion circuit configured to convert the frame to be compatible with the second network.

20 Claims, 7 Drawing Sheets

(56) References Cited

U.S. PATENT DOCUMENTS

| | | | |
|---|---|---|---|
| 8,665,891 B2* | 3/2014 | Katou | H04L 12/40013 370/401 |
| 9,280,501 B2 | 3/2016 | Hopfner | |
| 2007/0140294 A1 | 6/2007 | Takatori et al. | |
| 2010/0158045 A1 | 6/2010 | Shin et al. | |
| 2010/0306457 A1 | 12/2010 | Wilson et al. | |
| 2015/0229741 A1* | 8/2015 | Kim | H04L 12/40169 370/467 |
| 2016/0080168 A1 | 3/2016 | Lieder et al. | |
| 2016/0359545 A1* | 12/2016 | Kodama | H04L 12/407 |
| 2017/0072876 A1 | 3/2017 | Rajan et al. | |
| 2018/0295112 A1* | 10/2018 | Coppola | H04L 63/068 |
| 2019/0068407 A1 | 2/2019 | Haga et al. | |
| 2019/0132424 A1* | 5/2019 | Jeong | H04L 69/18 |
| 2019/0141133 A1 | 5/2019 | Rajan et al. | |
| 2019/0268444 A1 | 8/2019 | Mardmoeller et al. | |
| 2020/0351123 A1 | 11/2020 | Haga et al. | |
| 2020/0351387 A1* | 11/2020 | Bhimavarapu | H04L 69/08 |
| 2021/0203526 A1* | 7/2021 | Latham | H04L 41/065 |
| 2021/0250428 A1 | 8/2021 | Mardmoeller et al. | |
| 2022/0150089 A1* | 5/2022 | Kurachi | H04L 12/40026 |

FOREIGN PATENT DOCUMENTS

| | | |
|---|---|---|
| KR | 10-0884296 B1 | 2/2009 |
| KR | 10-2010-0073846 A | 7/2010 |
| KR | 10-2011-0035247 A | 4/2011 |
| KR | 10-2011-0046088 A | 5/2011 |
| KR | 10-2011-0057371 A | 6/2011 |
| KR | 10-1080161 B1 | 11/2011 |
| KR | 10-1100336 B1 | 12/2011 |
| KR | 10-2012-0014554 A | 2/2012 |
| KR | 10-1217684 B1 | 1/2013 |
| KR | 10-2013-0064500 A | 6/2013 |
| KR | 10-1480052 B1 | 1/2015 |
| KR | 10-1952117 B1 | 2/2019 |
| WO | 2017/140367 A1 | 8/2017 |

OTHER PUBLICATIONS

Extended European Search Report (EESR) dated Sep. 5, 2023, issued in corresponding European Patent Application No. 21831920.0.

* cited by examiner

NETWORK ROUTING DEVICE AND METHOD

CROSS-REFERENCE TO RELATED APPLICATIONS

This application claims the benefit of Korean Patent Application No. 10-2020-0079600, filed on Jun. 29, 2020 in the Korean Intellectual Property Office, the disclosure of which is incorporated herein in its entirety by reference.

TECHNICAL FIELD

The present invention relates to a device and method for routing using an extended ID field in a CAN network.

BACKGROUND ART

In general, in the case of a Controller Area Network (CAN) network, it is possible to communicate with priority by occupying a communication BUS using an ID field of a frame. Nodes that are included in such a CAN network and share one bus classify the messages they need to receive through ID field filtering.

However, as each node of the CAN network is connected to one CAN communication bus, it is necessary to continuously process unnecessary messages. Therefore, it is not possible to accurately classify networks according to the characteristics or functions of each device. In addition, as the number of nodes increases, there is a limit in that a bus for CAN communication must be continuously connected.

Meanwhile, in the case of CAN 2.0b, which is one of the communication protocols of the CAN network, more messages can be registered and used through the extended ID field of the frame. However, the CAN 2.0b and the existing CAN 2.0a have a different frame structure and thus are not compatible with each other.

DISCLOSURE OF THE INVENTION

Technical Problem

The present invention has been devised to solve the above problems, and an object of the present invention is to provide a network routing device and method in which by using the ID field of the CAN network frame as a routing target network designation, a plurality of nodes can transmit messages at the same time in a physically separated network and routing target message, and message IDs can be reused.

Technical Solution

A network routing device according to an embodiment of the present invention, as a routing device for transmitting a frame between nodes connected to different communication networks of a plurality of communication networks, includes a routing processing unit configured to determine a second network that is a routing target among the plurality of communication networks based on frame information received from a first network transmitting a frame among the plurality of communication networks, and a frame conversion unit configured to convert the frame to be compatible with the second network.

A communication node according to an embodiment of the present invention, as a communication node configured to be connectable to a plurality of communication networks and configured to transmit a frame between nodes connected to different communication networks of the plurality of communication networks, includes a network routing device configured to determine a second network that is a routing target among the plurality of communication networks and convert a frame to be compatible with the second network based on information of the frame received from a first network transmitting the frame among the plurality of communication networks, a first communication module configured to support a communication protocol used in the first network and receive the frame from a node connected to the first network, and a second communication module configured to support a communication protocol used in the second network and transmit a frame received from the first network to the second network.

A network routing method according to an embodiment of the present invention, as a routing method for transmitting a frame between nodes connected to different communication networks of a plurality of communication networks, includes determining a second network that is a routing target among the plurality of communication networks based on frame information received from a first network transmitting a frame among the plurality of communication networks; and converting the frame to be compatible with the second network.

Effects of the Invention

According to the network routing device and method of the present invention, by utilizing a specific field of the CAN network frame as a routing target network designation and routing target message, a plurality of nodes can simultaneously transmit messages in a physically separated network, and message IDs can be reused.

MODES FOR CARRYING OUT THE INVENTION

Figure 1:
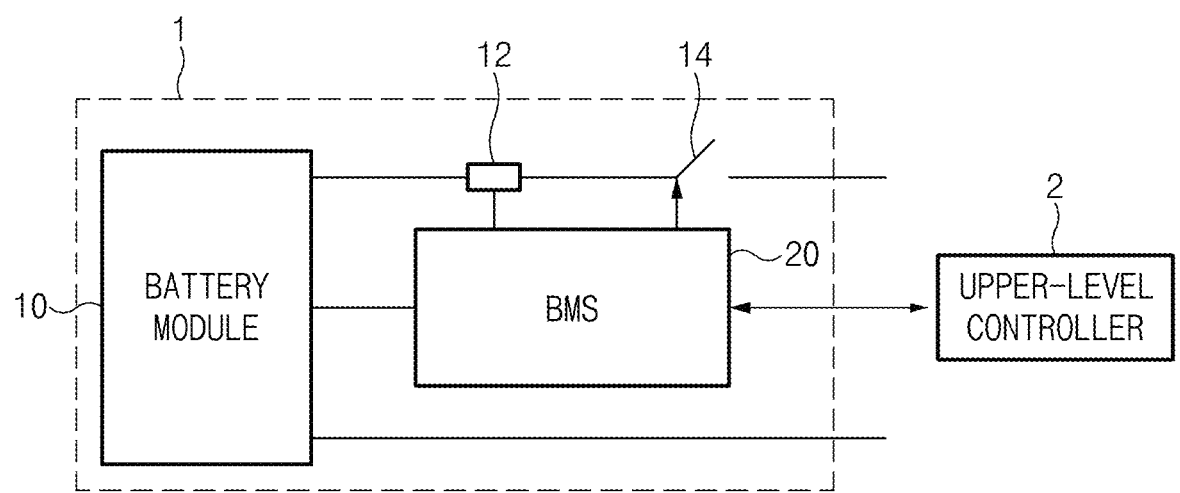
FIG. 1 is a block diagram showing the configuration of a general battery control system.

Hereinafter, various embodiments of the present invention will be described in detail with reference to the accompanying drawings. In this document, the same reference numerals are used for the same components in the drawings, and duplicate descriptions of the same components are omitted.

For the various embodiments of the present invention disclosed in this document, specific structural or functional descriptions have been exemplified for the purpose of describing the embodiments of the present invention only and various embodiments of the present invention may be implemented in various forms and should not be construed as being limited to the embodiments described in this document.

Expressions such as "first", "second", "first", or "second" used in various embodiments may modify various elements regardless of their order and/or importance, and do not limit the corresponding elements. For example, without departing from the scope of the present invention, a first component may be referred to as a second component, and similarly, a second component may be renamed and referred to as a first component.

Terms used in this document are only used to describe a specific embodiment and may not be intended to limit the scope of other embodiments. The terms of a singular form may include plural forms unless otherwise specified.

All terms used herein, including technical or scientific terms, may have the same meaning as commonly understood by a person of ordinary skill in the art. Terms defined in a commonly used dictionary may be interpreted as having the same or similar meaning as the meaning in the context of the related technology, and are not interpreted as ideal or excessively formal meanings unless explicitly defined in this document. In some cases, even terms defined in this document cannot be interpreted to exclude embodiments of the present invention.

FIG. 1 is a block diagram showing the configuration of a general battery control system.

Referring to FIG. 1, it schematically shows a battery control system including a battery pack 1 and an upper-level controller 2 included in an upper-level system according to an embodiment of the present invention.

As shown in FIG. 1, the battery pack 1 includes a battery module 10 consisting of one or more battery cells and capable of charging and discharging, a switching unit 14 connected in series to the + terminal side or the − terminal side of the battery module 10 to control the charge/discharge current flow of the battery module 10, and a battery management system 20 for controlling and managing the voltage, current, temperature, and the like of the battery pack 1 to prevent overcharging and overdischarging.

Here, the switching unit 14 is a semiconductor switching element for controlling the current flow for charging or discharging of the battery module 10, and for example, at least one MOSFET, or a relay, a magnetic contactor, and the like may be used according to the specifications of the battery pack 1.

In addition, in order to monitor the voltage, current, temperature, etc. of the battery pack 1, the BMS 20 may measure or calculate a voltage and a current of a gate, a source, and a drain of a semiconductor switching device. In addition, the BMS 20 may measure the current, voltage, temperature, etc. of the battery pack using the sensor 12 provided adjacent to the semiconductor switching element. The BMS 20 is an interface for receiving values obtained by measuring the above-described various parameters, and may include a plurality of terminals and a circuit connected to these terminals to process input values.

In addition, the BMS 20 may control ON/OFF of the switching unit 14, for example, a MOSFET, and may be connected to the battery module 10 to monitor the state of the battery module 10.

The upper-level controller 2 may transmit a control signal for the battery module to the BMS 20. Accordingly, the operation of the BMS 20 may be controlled based on a signal applied from the upper-level controller. The battery cell of the present invention may be included in a battery pack used for an Energy Storage System (ESS) or a vehicle. And in this case, the upper-level controller 2 may be an ESS controller or a vehicle controller. However, the battery pack 1 is not limited to this use.

Since the configuration of the battery pack 1 and the configuration of the BMS 20 are known configurations, a more detailed description will be omitted.

Figure 2:
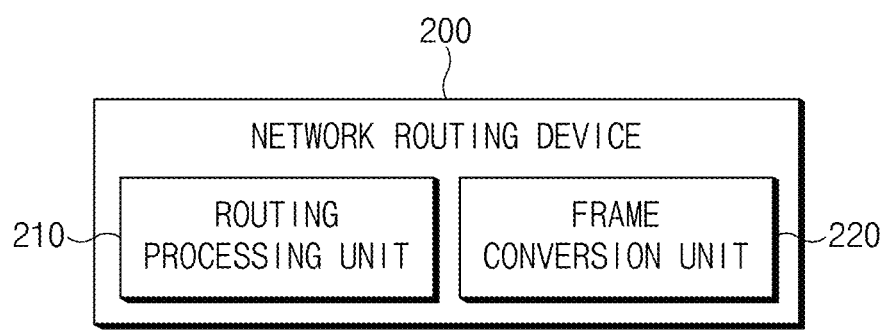
FIG. 2 is a block diagram showing the configuration of a network routing device according to an embodiment of the present invention.

FIG. 2 is a block diagram showing the configuration of a network routing device according to an embodiment of the present invention.

Referring to FIG. 2, the network routing device 200 according to an embodiment of the present invention may include a routing processing unit 210 and a frame conversion unit 220.

Network routing device 200 according to an embodiment of the present invention may be a device for routing a plurality of communication networks for transmitting and receiving a frame having a structure including a first part including information for specifying a routing target network and a second part including a routing target message between each node. That is, in the network routing device according to an embodiment of the present invention, the extended ID field of the CAN frame may be divided into subfields to be used as a routing target network designation and a routing target message.

In addition, a plurality of communication networks communicating through the network routing device 200 according to an embodiment of the present invention may be physically separated from each other, and each communication network may use the CAN protocol. In this case, the plurality of communication networks may be any one of a CAN 2.0a or a CAN 2.0b bus. As such, since a plurality of communication networks are physically separated in the form of a CAN bus, a plurality of nodes connected to different communication networks can simultaneously transmit messages within the network. Also, since the network is separated, the message ID can be used as it is.

The routing processing unit 210 may determine a communication network (a second network), that is a routing target, among a plurality of communication networks based on the information of the frame received from the communication network (first network) transmitting the frame. In this case, the routing processing unit 210 may determine a routing target network among a plurality of communication networks based on the information of the above-described first part of the CAN frame. In addition, the first part and the second part of the CAN frame may be included in an Extended ID (EID) field or a Standard ID (SID) field of the frame, and each of the first part and the second part may have a preset number of bits.

Meanwhile, a reserved field of the CAN frame used in the routing processing unit 210 may include information indicating whether to route to one communication network among a plurality of communication networks. For example, the reserved field may indicate 1 if the received frame is a routing target, and may indicate 0 if it is not a routing target. The routing processing unit 210 may determine whether the frame is routed to another network based on the reserved field of the frame.

The frame conversion unit 220 may convert a frame to be compatible with the routing target network when the communication protocols of the frame transmission network and the routing target network are different from each other. For example, when the communication protocol of the frame transmission network is CAN 2.0b and the communication protocol of the routing target network is CAN 2.0a, the frame conversion unit 220 may copy and transmit at least a part of the extended ID field of the frame (e.g., the routing target message) to the standard ID field of the CAN 2.0a frame of the routing target network.

Meanwhile, although not shown in FIG. 2, the network routing device 200 according to an embodiment of the present invention may include a storage unit. Since the memory unit may store routing target network information, routing target message, routing designator information, etc. of a received or transmitted frame, it allows the user to check frame information or history as needed. In addition, the storage unit may not be included in the routing device 200, but may be included in the communication node 300 to be described later.

Figure 3:
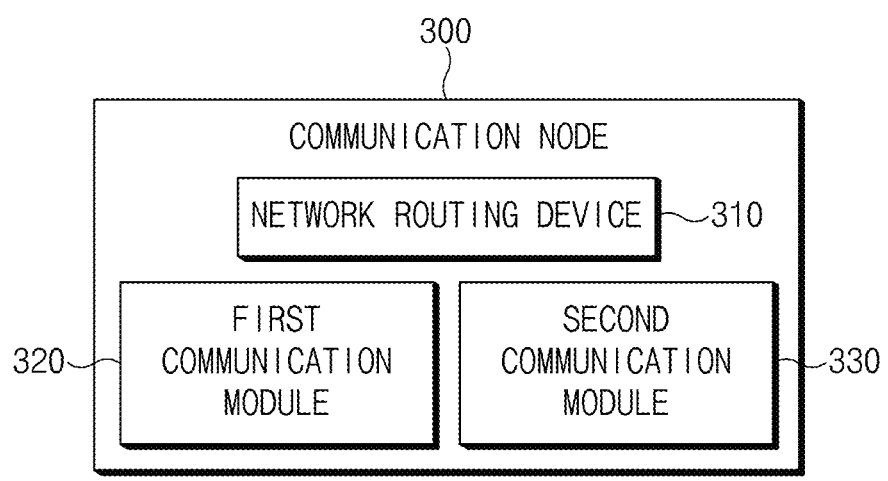
FIG. 3 is a block diagram showing the configuration of a communication node according to an embodiment of the present invention.

FIG. 3 is a block diagram showing the configuration of a communication node according to an embodiment of the present invention.

Referring to FIG. 3, the communication node 300 according to an embodiment of the present invention is for transmitting and receiving frames between each node by a plurality of communication networks, and may include a network routing device 310, a first communication module 320, and a second communication module 330.

The network routing device 310 may determine a communication network that is a routing target among a plurality of communication networks based on the frame information received from the communication network transmitting the frame, and convert the frame to be compatible with the routing target network. Here, since the network routing device 310 is substantially the same as the network routing device 200 of FIG. 2, a detailed description thereof will be omitted.

The first communication module 320 may receive a frame from a frame transmission network. The first communication module 320 communicates with a plurality of nodes connected to the first network. The first communication module 320 may support a first communication protocol used in the first network. For example, the first communication module 320 may support the CAN protocol and transmit/receive a frame in a corresponding network through a plurality of data lines constituting the CAN bus.

The first communication module 320 transmits the frame received from the first network to the network routing device 310 based on information on a field indicating whether routing is performed in the received frame. For example, information indicating whether to route to one communication network among a plurality of communication networks may be included in the reserved field of the received frame. In addition, the first communication module 320 may transmit the received frame to the network routing device 310 based on the information of the reserved field, or transmit the received frame to a control unit (not shown) of the communication node 300 to process the frame, or ignore the received frame.

The second communication module 330 may transmit the frame received from the frame transmission network to the routing target network. The second communication module 330 communicates with a plurality of nodes connected to the second network. The second communication module 330 may support a second communication protocol used in the second network. For example, the second communication module 330 may support the CAN protocol and transmit/receive a frame in a corresponding network through a plurality of data lines constituting the CAN bus.

The frame transmitted to the second network by the second communication module 330 includes a routing target message included in the frame when transmitted from the first network, and based on this, the node corresponding to the message in the second network may receive the frame.

Figure 4A:
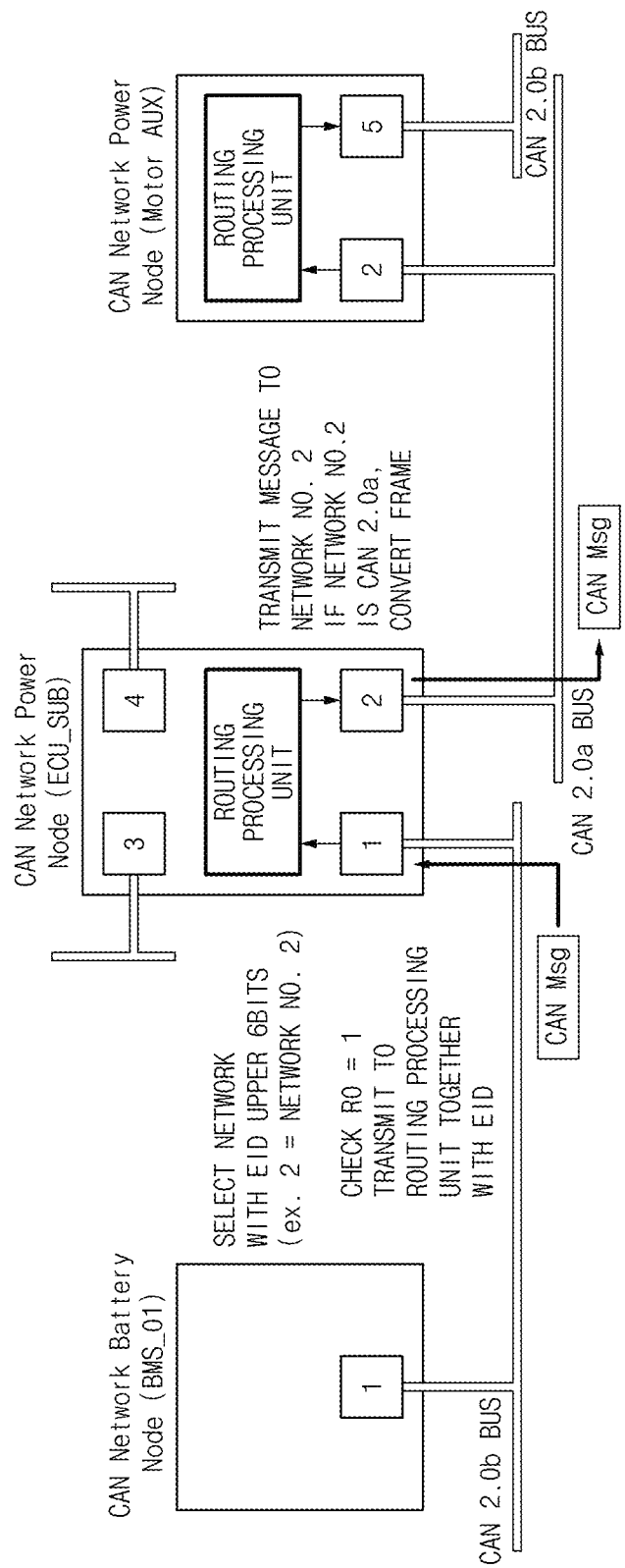
FIG. 4A is a diagram illustrating an operation of a network routing device according to an embodiment of the present invention.
Figure 4B:
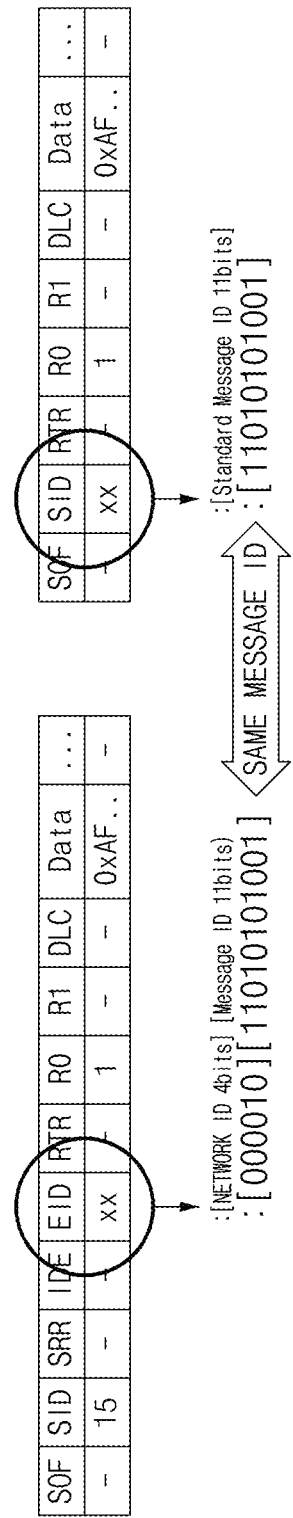
FIG. 4B is a diagram illustrating a structure of a frame used in a network routing device according to an embodiment of the present invention.

FIG. 4A is a diagram illustrating an operation of a network routing device according to an embodiment of the present invention. Also, FIG. 4B is a diagram illustrating a structure of a frame used in a network routing device according to an embodiment of the present invention. In FIG. 4B, the left side shows the frame structure of CAN 2.0b, which is a frame transmission network, and the right side shows the frame structure of CAN 2.0a, which is a routing target network.

Referring to FIG. 4A, networks No. 1 to No. 4 transmit and receive frames through the network routing device of the present invention. As shown in FIG. 4A, network No. 1 is a battery BMS node of the CAN network, network No. 2 is a power supply Motor AUX node, and networks No. 3 and 4 are control ECU SUB nodes.

If, in FIG. 4A, a frame is transmitted from network No. 1, which is a CAN 2.0b bus, to network No. 2, which is a CAN 2.0a bus, the network routing device first checks the reserved field in the CAN frame. As in the left frame structure of FIG. 4B, when information included in the reserve frame R0 is 1, a frame including an extended ID field EID as a routing target frame is transmitted to the routing processing unit 210. At this time, the information included in the reserve frame R0 is not limited to 1 or 0 as shown in FIG. 4B and may be expressed in various ways.

Next, the routing processing unit 210 selects a routing target network with reference to the extended ID field of the received frame. In this case, the routing target network may be determined based on a predetermined number of bits (e.g., upper 6 bits) of the extension ID field. For example, when network No. 2 is the routing target network, the upper 6 bits of the extended ID field may be expressed as [000010] as shown in FIG. 4B.

After determining the routing target network in the routing processing unit 210, the network routing device transmits a message to the routing target network. In this case, the transmitted message may be the remaining part (second part) except for the target network designation part (first part) in the extended ID field of the frame. That is, as shown in FIG. 4B, the message of the transmitted frame may be expressed by the number of 11 bits of [11010101001], and may be used to identify the message and indicate the priority.

However, in the present invention, the number of bits for designating the routing target network and the number of bits for the routing target message are not limited thereto, and may be set arbitrarily by a user as needed.

If network No. 2 is CAN 2.0a, the frame conversion unit 220 converts the frame to be compatible with CAN 2.0a. For example, the routing target message part (11 bits) of the CAN 2.0b frame of FIG. 4B may be copied and transmitted to the standard ID field of the CAN 2.0a frame, which is the routing target network. On the other hand, if the frame transmission network is CAN 2.0a and the routing target network is CAN 2.0b, the message of the standard ID field of the CAN 2.0a frame may be copied and transmitted to the standard ID field or the extended ID field of the CAN 2.0b frame.

In such a way, according to the network routing device according to an embodiment of the present invention, even when the frame structure is different from each other due to different communication protocols (e.g., CAN 2.0a and CAN 2.0b) by utilizing the ID field of the frame structure, frames can be transmitted without a separate device or application.

Figure 5:
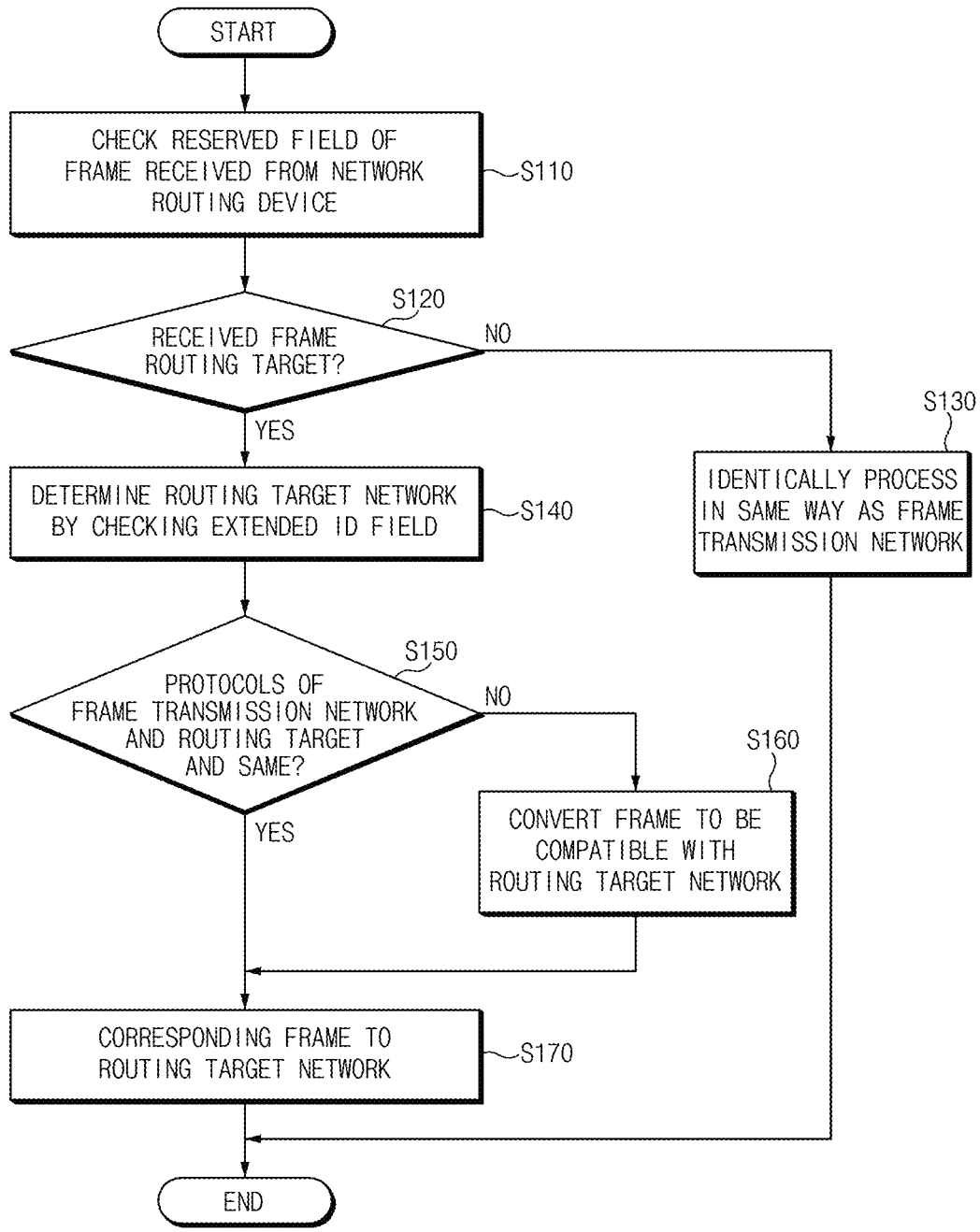
FIG. 5 is a flowchart illustrating a network routing method according to an embodiment of the present invention.

FIG. 5 is a flowchart illustrating a network routing method according to an embodiment of the present invention.

Referring to FIG. 5, first, the reserved field of the frame received from the network routing device is checked (S110). In this case, the reserved field of the CAN frame may include information indicating whether to route to the target network. For example, the reserved field may indicate 1 if the received frame is a routing target, and may indicate 0 if it is not a routing target. Accordingly, the network routing device of the present invention may determine whether the frame is routed to another network based on the reserved field of the frame.

Then, it is determined whether the frame received by the network routing device is a routing target (S120). If the received frame is not a routing target (NO), it is processed in the same way as the frame transmission network (S130).

On the other hand, if the received frame is a routing target (YES), a routing target network is determined by checking the extended ID field of the frame (S140). In this case, the routing target network information of the extension ID field may be indicated by a preset number of upper bits (e.g., 6 bits).

Next, it is determined whether the communication protocols of the frame transmission network and the routing target network are the same (S150). If the communication protocols of the frame transmission network and the routing target network are the same, the frame is transmitted to the routing target network as it is (S170).

On the other hand, when the communication protocols of the frame transmission network and the routing target network are different (NO), the frame is converted to be compatible with the routing target network (S160). For example, if the routing target network is CAN 2.0a and the frame transmission network is CAN 2.0b, the routing target message in the extended ID field of the frame can be copied into the standard ID field of the CAN 2.0a frame of the routing target network. Then, the converted frame is transmitted to the routing target network (S170).

As such, according to the network routing method according to an embodiment of the present invention, by using the ID field of the CAN network frame as a routing target network designation and routing target message, a plurality of nodes can simultaneously transmit messages in a physically separated network, and message IDs can be reused.

Figure 6:
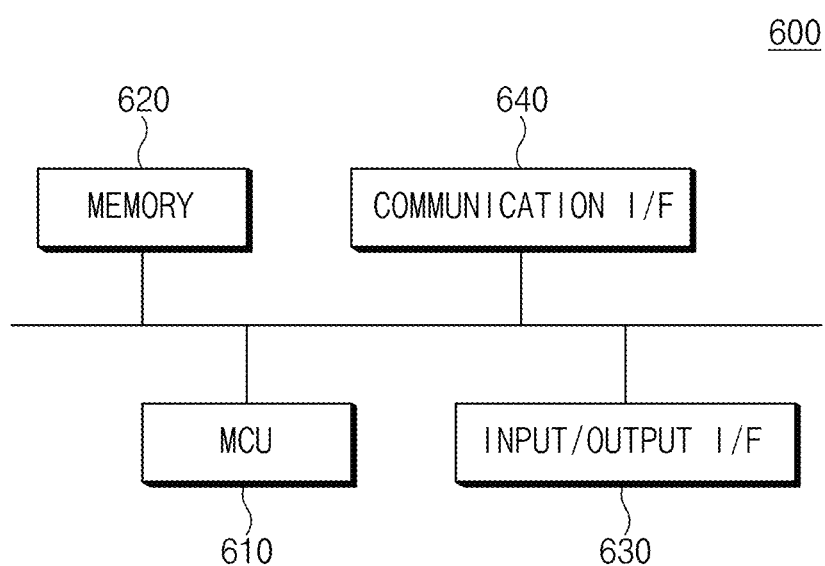
FIG. 6 is a diagram illustrating a hardware configuration of a network routing device according to an embodiment of the present invention.

FIG. 6 is a diagram illustrating a hardware configuration of a network routing device according to an embodiment of the present invention.

Referring to FIG. 6, the battery management system 600 may include a microcontroller (MCU) 610 for controlling various processes and each configuration, a memory 620 on which an operating system program and various programs (e.g., a routing target network calculation program, a frame conversion program, etc.) are recorded, an input interface between a battery cell module and/or a semiconductor switching element, an input/output interface 630 that provides an output interface, and a communication interface 640 capable of communicating with the outside through a wired/wireless communication network. In this way, the computer program according to the present invention may be recorded in the memory 620 and processed by the microcontroller 610, and for example, may be implemented as a module that performs each functional block shown in FIG. 2.

In the above, even if all the components constituting the embodiments of the present invention are described as being combined into one or operating in combination, the present invention is not necessarily limited to these embodiments. That is, within the scope of the object of the present invention, all of the constituent elements may be selectively combined and operated in one or more.

In addition, terms such as "include", "consist of" or "have" described above mean that the corresponding constituent components can be present unless otherwise stated, and it should be construed that other components may be further included rather than excluding other components. All terms, including technical or scientific terms, have the same meaning as commonly understood by one of ordinary skill in the art, unless otherwise defined. Terms commonly used, such as terms defined in the dictionary, should be interpreted as being consistent with the meaning of the context of the related technology, and unless explicitly defined in the present invention, they are not interpreted in an ideal or excessively formal sense.

The above description is merely illustrative of the technical idea of the present invention, and those of ordinary skill in the art to which the present invention pertains will be able to make various modifications and variations without departing from the essential characteristics of the present invention. Therefore, the embodiments disclosed in the present invention are not intended to limit the technical idea of the present invention, but to explain, and the scope of the technical idea of the present invention is not limited by these embodiments. The scope of protection of the present invention should be interpreted by the claims below, and all technical ideas within the scope equivalent thereto should be construed as being included in the scope of the present invention.

The invention claimed is:

1. A network routing device for transmitting a frame between nodes connected to separate communication networks among a plurality of communication networks, the network routing device being configured to receive a frame from a first network among the plurality of communication networks and to check a reserved field of the frame indicating whether the frame is to be routed to another network among the plurality of communication networks, the network routing device comprising:
   a routing processing circuit configured to, if the reserved field indicates that the received frame is to be routed to another network:
      determine a second network that is a routing target among the plurality of communication networks based on information in the frame received from the first network;
      determine whether the first network and the second network use a same communication protocol; and
      output the frame as received from the first network for routing to the second network if the first network and the second network are determined to use the same communication protocol; and
   a frame conversion circuit configured to convert the frame received from the first network to be compatible with the second network if the first network and the second network are determined not to use the same communication protocol,
   wherein, if the reserved field indicates that the frame received from the first network is not to be routed to another network, the network routing device is further configured to process the frame in a same way as the first network.

2. The network routing device of claim 1, wherein the frame includes a plurality of fields, one of the plurality of fields being an ID field having a structure including a first part including information for designating the second network and a second part including a routing target message.

3. The network routing device of claim 2, wherein the first part and the second part are included in an extended ID (EID) field of the frame.

4. The network routing device of claim 2, wherein the first part and the second part each have a preset number of bits.

5. The network routing device of claim 1, wherein each of the plurality of communication networks uses a CAN protocol, and at least two of the plurality of communication networks use a same CAN protocol.

6. The network routing device of claim 5, wherein a communication protocol used by each respective network among the plurality of communication networks is either CAN 2.0a or CAN 2.0b protocol, at least one of the communication networks uses the CAN 2.0a protocol, and at least one other of the communication networks uses the CAN 2.0b protocol.

7. The network routing device of claim 6, wherein if a communication protocol of the first network is CAN 2.0b and a communication protocol of the second network is CAN 2.0a, the frame conversion circuit is configured to copy and transmit a routing target message included in an extended ID field of the frame of the first network to a standard ID field of a frame of the second network.

8. The network routing device of claim 1, wherein the plurality of communication networks are physically separated from each other.

9. The network routing device of claim 1, wherein the routing processing circuit is further configured to receive only a frame including information indicating that the frame is to be routed to another communication network in the reserved field of the frame.

10. A communication node configured to be connectable to a plurality of communication networks and configured to transmit a frame between nodes connected to separate communication networks among the plurality of communication networks, the communication node comprising:
    a first communication circuit configured to support a communication protocol used in a first network among the plurality of networks and to receive a frame compatible with the first network from a node connected to the first network;
    a network routing device configured to:
        receive the frame from the first communication circuit;
        check a reserved field of the received frame indicating whether the received frame is to be routed to another network among the plurality of communication networks;
        if the reserved field indicates that the received frame is to be routed to another network, determine a second network that is a routing target among the plurality of communication networks based on information in the received frame, determine whether the first network and the second network use a same communication protocol, output the frame as received from the first communication circuit if the first network and the second network are determined to use the same communication protocol, and convert the received frame to be compatible with the second network if first network and the second network are determined not to use the same communication protocol; and
    a second communication circuit configured to support the communication protocol used in the second network and to transmit the converted frame or the frame as received from the first communication circuit, as output by the network routing device, to the second network.

11. The communication node of claim 10, wherein:
    at least two of the plurality of communication networks use a same communication protocol, and
    the network routing device is further configured to process the received frame in a same way as the first network if the reserved field of the received frame indicates that the frame is not to be routed to a network other than the first network.

12. The communication node of claim 10, wherein a communication protocol used by each respective network among the plurality of communication networks is either CAN 2.0a or CAN 2.0b protocol, at least one of the communication networks uses the CAN 2.0a protocol, and at least one other of the communication networks uses the CAN 2.0b protocol.

13. The communication node of claim 12, wherein, if a communication protocol of the first network is CAN 2.0b and a communication protocol of the second network is CAN 2.0a, the network routing device is further configured to convert of the received frame by copying a routing target message included in an extended ID field of the frame of the first network to a standard ID field of a frame of the second network.

14. A routing method for transmitting a frame between nodes connected to two or more communication networks among a plurality of communication networks, the method comprising:
    receiving a frame from a first network among the plurality of communication networks;
    checking a reserved field in the received frame indicating whether the frame is to be routed to a network other than the first network among the plurality of communication networks;
    if the reserved field of the received frame indicates that the frame is to be routed to a network other than the first network:
        determining a second network that is a routing target among the plurality of communication networks based on information in an ID field of the frame received from the first network;
        determining whether the first network and the second network use a same communication protocol;
        if the first network and the second network are determined not to use the same communication protocol, converting the frame to be compatible with the second network and transmitting the converted frame to the second network; and
        if the first network and the second network are determined to use the same communication protocol, transmitting the frame as received from the first network to the second network; and
    if the reserved field of the frame received from the first network indicates that the frame is not to be routed to a network other than the first network, processing the frame in a same way as the first network.

15. The method of claim 14, wherein the frame includes a plurality of fields, one of the plurality of fields being the ID field having a structure including a first part including information for designating the second network and a second part including a routing target message.

16. The method of claim 15, wherein the first part and the second part are included in an extended ID (EID) field of the frame.

17. The method of claim 15, wherein the first part and the second part each have a preset number of bits.

18. The method of claim 14, wherein each of the plurality of communication networks uses a CAN protocol, and at least two of the plurality of communication networks use a same CAN protocol.

19. The method of claim 18, wherein a communication protocol used by each respective network among the plurality of communication networks is either CAN 2.0a or CAN 2.0b protocol, at least one of the communication networks uses the CAN 2.0a protocol, and at least one other of the communication networks uses the CAN 2.0b protocol.

20. The method of claim 14, wherein, if a communication protocol of the first network is CAN 2.0b and a communication protocol of the second network is CAN 2.0a, the converting of the frame includes copying a routing target message included in an extended ID field of the frame of the first network to a standard ID field of a frame of the second network.

* * * * *